United States Patent [19]

Dumbaugh, Jr.

[11] Patent Number: 4,469,799

[45] Date of Patent: Sep. 4, 1984

[54] EASILY MELTABLE DENSE OPAL GLASSES

[75] Inventor: William H. Dumbaugh, Jr., Painted Post, N.Y.

[73] Assignee: Corning Glass Works, Corning, N.Y.

[21] Appl. No.: 487,965

[22] Filed: Apr. 25, 1983

[51] Int. Cl.³ .......................... C03C 3/04; C03C 3/30
[52] U.S. Cl. ........................................ 501/32; 501/59
[58] Field of Search .................................... 501/32, 59

[56] References Cited

U.S. PATENT DOCUMENTS

| | | | |
|---|---|---|---|
| 1,778,305 | 10/1930 | Blau | 65/30.1 |
| 2,132,390 | 10/1938 | Blau | 65/33 |
| 2,224,469 | 12/1940 | Blau | 501/30 |
| 2,921,860 | 1/1960 | Stookey | 501/59 |
| 3,622,359 | 11/1971 | Dither et al. | 501/59 |
| 3,661,601 | 5/1972 | Dumbaugh | 501/59 |
| 3,667,973 | 6/1972 | Flannery | 501/59 |
| 4,187,094 | 2/1980 | Lu et al. | 501/59 |
| 4,309,219 | 1/1982 | Flannery et al. | 501/32 |
| 4,323,653 | 4/1982 | Holland et al. | 501/32 |

FOREIGN PATENT DOCUMENTS

| | | | |
|---|---|---|---|
| 1543227 | 10/1968 | France | 501/32 |
| 1289185 | 9/1972 | United Kingdom | 501/32 |

*Primary Examiner*—Mark Bell
*Attorney, Agent, or Firm*—C. S. Janes, Jr.

[57] ABSTRACT

This invention relates to easily meltable, thermally opacifiable, dense white opal glasses which exhibit satisfactory weathering resistance and consist essentially, in weight percent, of 7–12% $Na_2O$, 0.8–3.8% $CaO$, 3–7% $Al_2O_3$, 4–8% $B_2O_3$, 69–75% $SiO_2$, and 3.5–4.5% F.

2 Claims, No Drawings

EASILY MELTABLE DENSE OPAL GLASSES

BACKGROUND OF THE INVENTION

Two broad classes of opal glasses have been recognized in the art for many years. The first of these, viz., spontaneous opal glasses, comprise compositions which develop opacity as the molten batch is cooled to a glass article; the opacity being the result of the growth of crystals in the glass or from some other type of phase separation occurring within the glass. The second category, termed thermally opacifiable or reheat opal glasses, includes compositions which exhibit little or no opacity when the molten batch is cooled to a glass article but, when the glass article is subjected to temperatures in the vicinity of or slightly above the annealing point of the glass, crystal growth or some other phase separation phenomenon will occur to generate opacity. In both categories of glasses, the crystal content or other phase separation developed is customarily quite small, commonly less than 10% by volume, such that the overall physical properties of the glass, other than optical transmission, will be affected only slightly, if at all. Whereas spontaneous opal glasses are generally less expensive to produce, the crystal growth or other phase separation phenomenon can be more carefully controlled in the reheat opal glasses, thereby yielding opacities of very uniform density.

Dense white glasses have been and are currently used extensively in dinnerware applications. Most generally, those glasses have been prepared from silicate-based compositions wherein sodium fluoride or calcium fluoride crystals are precipitated. As the cost of energy has risen, there has been an increased desire to develop glasses manifesting the lowest melting viscosity possible while still maintaining dense white opacity and satisfactory chemical durability.

One feature of NaF-type opal glasses which must be examined is their susceptibility to weathering. Hence, in the presence of moisture, Na$^+$ ions will be drawn out of the surface of the glass unless the overall glass composition is designed to tie up those ions to thereby inhibit that migration.

OBJECTIVE OF THE INVENTION

The principal objective of the present invention is to provide thermally opacifiable opal glasses exhibiting low melting viscosities coupled with dense white opacity and satisfactory chemical durability.

SUMMARY OF THE INVENTION

That objective can be achieved in a narrow range of base compositions within the Na$_2$O-CaO-Al$_2$O$_3$-B$_2$O$_3$-SiO$_2$-F system consisting essentially, expressed in terms of weight percent on the oxide basis, of Na$_2$O 7-12
CaO 0.8-3.8
Al$_2$O$_3$ 3-7
B$_2$O$_3$ 4-8
SiO$_2$ 69-75
F 3.5-4.5

Care must be exercised in including other components in the base composition. Consequently, though occasionally useful in adjusting the melting and forming behavior of the glasses and/or the physical and chemical porperties demonstrated thereby, the total of any additions of compatible metal oxides will be held to a maximum of 4%. Illustrative of such additions are up to 3% K$_2$O, up to 2% ZnO, and up to 0.25% As$_2$O$_3$.

As defined herein, the melting temperature represents the temperature at which the glass exhibits a viscosity no greater than about 200 poises. The glasses of this invention manifest a melting temperature no higher than about 1400° C.

The stated amounts of the base glass constituents must also be rigorously observed. For example:

At Na$_2$O levels below 7%, the glass becomes difficult to melt and opacity is adversely affected. Na$_2$O has a strong effect upon the softening point of the glass. A softening point above 700° C. is highly desirable to permit the firing of decorations of good gloss and durability onto the glass. For that reason and the effect upon weatherability, the maximum Na$_2$O content of 12% will be observed.

Where CaO is employed in amounts either above or below the limits set out, glass opacity deteriorates. An optimum level appears to be at about 2.5%.

At least 3% Al$_2$O$_3$ is needed to insure good chemical durability, but values above 7% render the glass difficult to melt.

At levels of B$_2$O$_3$ below 4%, weatherability becomes a serious problem, and contents greater than 8% lead to reduced opacity.

The softening point is lowered when SiO$_2$ is present in amounts less than 69%. Above 75% the glass becomes difficult to melt.

A minimum of 3.5% F, as analyzed in the glass, is demanded to achieve the desired opacity. As is readily recognized, fluorine is volatilized off during melting so an additional amount will be incorporated in the batch to compensate for this loss. The extent of this loss is a function of the melting practice utilized. For example, losses can range from less than 10% to over 50%. Inasmuch as the fluorine volatilization is a pollution problem, excessive amounts will ordinarily be avoided. Consequently, whereas levels in excess of 4.5% F, as analyzed, can be employed satisfactorily, they are unnecessary to attain the desired opacity. Therefore, 4.5% F, as anlayzed in the glass, has been deemed a practical maximum value.

As$_2$O$_3$ is useful as a fining agent. No significant improvement in effectiveness has been observed with contents above about 0.25%, however, to justify the added cost of using more.

K$_2$O and ZnO can be utilized to fine tune the physical and chemical properties of the glass. However, care must be observed in their additions to avoid deteriorating the opacity of the final product.

In general, the heat treatment necessary to nucleate and grow the NaF opacifying crystals will involve temperatures between about 675°-725° C., the time required being dependent upon the temperature employed. An exposure of about one hour at about 700° C. has been found to be a convenient practice.

PRIOR ART

An early description of thermally opacifiable opal glasses is provided in U.S. Pat. No. 1,778,305. The glasses generally described therein had compositions in the Na$_2$O-K$_2$O-PbO-Al$_2$O$_3$-SiO$_2$-F system. U.S. Pat. No. 2,132,390 refers to that former disclosure and sets forth a specific composition in the Na$_2$O-K$_2$O-PbO-Al$_2$O$_3$-SiO$_2$-F field.

U.S. Pat. No. 2,224,469 does not explicitly indicate whether the glasses described therein are spontaneous or reheat opal glasses. However, the base compositions therefor were encompassed within the $Na_2O$-$Al_2O_2$-$SiO_2$-F system and are specifically declared to be substantially free from second group and boron compounds.

Numerous glass compositions explicitly-identified as spontaneous opals have been disclosed. For example:

U.S. Pat. No. 2,921,860 describes glasses consisting essentially, in weight percent, of 0.5–3% $Li_2O$, 6–19.5% $Na_2O$, the total alkali metal oxide content being 12–20%, 2–12% $Al_2O_3$, 55–75% $SiO_2$, and 5–9% F. Up to 6% total of BaO, BeO, CaO, CdO, MgO, SrO, and ZnO may optionally be included, as may up to 6% PbO and up to 5% $B_2O_3$.

U.S. Pat. No. 3,622,359 is concerned with glasses consisting essentially, in weight percent, of 7–9% $Na_2O$, 3–7% $K_2O$, 7–9% $Al_2O_3$, 1–3% $B_2O_3$, 70–75% $SiO_2$, and 5–9% F. The glasses are asserted to be free from $Li_2O$ and essentially free from alkaline earth metal oxides.

U.S. Pat. No. 3,661,601 reveals glasses consisting essentially, in weight percent, of 0–7% $Na_2O$, 0–7% $K_2O$, the sum of $Na_2O$+$K_2O$ being 3–10%, 11–20% CaO, 3–9% $Al_2O_3$, 1–7% $B_2O_3$, 50–75% $SiO_2$, and 2–4% F. The opacity is caused not by NaF crystals but by insoluble glassy particles.

U.S. Pat. No. 3,667,973 discusses glasses consisting essentially, in weight percent, of 1.5–4% $Li_2O$, 0–10% $Na_2O$ and/or $K_2O$, 1–3% $Al_2O_3$, 7–14% $B_2O_3$, 70–80% $SiO_2$, 1–3% $MoO_3$ and/or $As_2O_3$ and/or $WO_3$, and 3–6% F. The glasses are stated to contain not more than 1% total of alkaline earth metal oxides.

U.S. Pat. No. 4,038,448 illustrates glasses consisting essentially, in weight percent, of 8–13% $Na_2O$, 5–9% $Al_2O_3$, 74–78% $SiO_2$, and 3.5–4.5% F. Up to 5% total of the following may optionally be included in the indicated amounts: 0–4% $K_2O$, 0–2.5% SrO, and 0–1% $Li_2O$.

U.S. Pat. No. 4,187,094 discloses glasses consisting essentially, in weight percent on the oxide basis, of 8–13% $Na_2O$, 5–9% $Al_2O_3$, 71–78% $SiO_2$, and 3–6% F. Up to 10% total of such optional components as BaO, $B_2O_3$, CaO, $K_2O$, $LI_2O$, and SrO may be included.

U.S. Pat. No. 4,309,219 describes glasses consisting essentially, in weight percent, of 4–10% $Na_2O$, 2–5% $K_2O$, 4.5–12% RO, wherein RO consists of 0–3% MgO, 0–6% CaO, 0–8% SrO, and 0–11% BaO, 6–15% $Al_2O_3$, 4–9% $B_2O_3$, 51–66% $SiO_2$, 1–6% $P_2O_5$, and 1–5% F. The opacity is effected through the presence of amorphous particles.

U.S. Pat. No. 4,323,653 covers glasses consisting essentially, in weight percent, of 2.5–3.5% $Na_2O$, 2.5–3.5% $K_2O$, 0.95–1.55% MgO, 5.75–6.75% $Al_2O_3$, 3.8–5.2% $B_2O_3$, 13.5–15.5% CaO, 62.5–66.5% $SiO_2$, and 2.75–3.75% F. Opacity is produced through the presence of $CaF_2$ crystals and crystals having a xonotlite structure.

British Pat. No. 1,289,185 involves glasses consisting essentially, in weight percent, of 0.5–5% $Li_2O$, 2–18% $Na_2O$ and/or $K_2O$, 1.5–12% $Al_2O_3$, 60–80% $SiO_2$, and 2–6% F. Up to 10% $B_2O_3$ may optionally be included and CaO is preferably absent.

None of the above disclosures provides a discussion of the compositional limitations demanded to produce the products of the present invention.

DESCRIPTION OF PREFERRED EMBODIMENTS

Table I records a number of exemplary batch compositions, expressed in terms of parts by weight on the oxide basis, illustrating the parameters of the inventive glasses. Inasmuch as the sum of the individual constituents closely approximates 100, for all practical purposes the reported values may be deemed to represent weight percent. Whereas it is not known with which cations(s) the fluoride is combined, it is simply tabulated as fluoride, in accordance with conventional glass analysis practice. The actual batch ingredients may comprise any materials, either the oxides or other compounds, which, when melted together, will be converted into the desired oxides in the proper proportions. As was observed above, fluoride volatilizes off during melting of the batch. Several chemical analyses were made for fluoride content in the final glass and those values are also recited in the table as F(A).

The batch ingredients were compounded, ballmilled together to assist in securing a homogeneous melt, and charged into platinum crucibles. After covering, the crucibles were introduced into a furnace operating at about 1400° C. and the batches melted for about four hours. A small portion of each melt was poured and immediately pressed between two iron plates to form a disc about 2 mm in cross section. The bulk of each melt was then cast onto a steel plate to form a slab about 1–2 cm in thickness and the slab immediately transferred to an annealer operating at about 560° C. The pressed discs were heat treated by placement into an electrically-fired furnace at room temperature, heating at furnace rate to 700° C., maintaining that temperature for 50 minutes, and then cutting off the electric power to the furnace and allowing it to cool to room temperature with the discs therewithin.

A qualitative evaluation of the opacity (Op.) exhibited by the discs was made visually and those observations are reported in the table, as light (L), medium (M), or dense (D). To be considered acceptable, the opacity must be at least medium-dense (M-D).

To provide an estimate of the weatherability of each glass (W), the amount of $Na_2O$ extracted from the glass surface after immersion in water at the boiling point for one hour was measured. A maximum loss of no more than about 10 micrograms $Na_2O/cm^2$ of glass surface has been deemed most preferable.

The opal liquidus (Op. Liq.) was determined in the following manner. A small sample of glass was heated electrically to melting on a strip of platinum. The power was then cut off and the reflectance of a laser beam directed onto the molten surface was measured as the sample cooled. Those results are reported below.

Annealing points (A.P.), strain points (St. P.), and coefficients of expansion (Exp.) over the range of 25°–300° C. and expressed in terms of $\times 10^{-7}/°C$. were measured upon rods cut from the heat treated pressed discs. In those few instances where annealing points, strain points, and coefficients of thermal expansion over the range of 0°–300° C. were determined on lampworked fibers, those measurements are so noted. All softening point (S.P.) determinations were conducted on lampworked fibers.

TABLE I

|   | 1 | 2 | 3 | 4 | 5 | 6 | 7 | 8 | 9 |
|---|---|---|---|---|---|---|---|---|---|
| $SiO_2$ | 71.62 | 70.24 | 70.24 | 70.24 | 71.62 | 71.62 | 71.62 | 71.62 | 71.62 |
| $B_2O_3$ | 6.16 | 6.16 | 6.16 | 6.16 | 6.16 | 6.16 | 4.16 | 4.16 | 4.16 |
| $Al_2O_3$ | 4.9 | 4.9 | 6.28 | 4.9 | 4.9 | 4.9 | 6.9 | 6.9 | 6.9 |
| $Na_2O$ | 11.94 | 11.94 | 11.94 | 11.94 | 9.94 | 9.94 | 11.94 | 9.94 | 9.94 |
| $K_2O$ | 0.52 | 0.52 | 0.52 | 0.52 | 2.52 | 0.52 | 0.52 | 2.52 | 0.52 |
| CaO | 1.39 | 1.39 | 1.39 | 2.77 | 1.39 | 3.39 | 1.39 | 1.39 | 3.39 |
| ZnO | — | 1.38 | — | — | — | — | — | — | — |
| F | 4.8 | 4.8 | 4.8 | 4.8 | 4.8 | 4.8 | 4.8 | 4.8 | 4.8 |
| F(A) | — | 3.75 | — | — | — | — | 3.88 | — | — |
| Op. | D | M-D | D | D | D | M-D | D+ | D+ | D+ |
| W | 13.0 | 9.2 | 11.0 | 9.1 | 11.0 | 5.5 | 13.0 | 16.0 | 7.7 |
| Op. Liq. | — | 950° C. | — | — | 890° C. | 1075° C. | 975° C. | 975° C. | 1125° C. |
| S.P. | 712° C. | 702° C. | 706° C. | 706° C. | 716° C. | 723° C. | 718° C. | 726° C. | 725° C. |
| A.P. | 517° C. | 511° C.* | 515° C.* | 521° C.* | 517° C.* | 531° C.* | 532° C.* | 537° C.* | 541° C.* |
| St.P. | 483° C. | 478° C.* | 483° C.* | 487° C.* | 487° C.* | 489° C. | 491° C. | 494° C. | 498° C. |
| Exp. | 73.5 | 76* | 74.5* | 75.5* | 73.6* | 69.7 | 73.4 | 73.4 | 70.2 |

*Measurements conducted on lampworked fibers

Several broad trends can be observed from Table I. First, increasing the level of CaO sharply raises the opal liquidus. Second, the substitution of CaO for $Na_2O$ improves the weatherability of the glass. Third, reducing the $B_2O_3$ level improves opacity but adversely affects weatherability.

Table II reflects compositional variations of Example 6. That glass was selected for further investigation because the heat treated opacity was satisfactory, the weatherability was quite acceptable, and the softening point was relatively high. The batches were compounded, mixed, melted, pressed into 2 mm thick discs, and the discs heat treated for 50 minutes at 700° C. in accordance with the practice described above with respect to Examples 1-9. Testing of the pressed discs was also carried out in like manner to that for Examples 1-9.

TABLE II

|   | 10 | 11 | 12 | 13 | 14 |
|---|---|---|---|---|---|
| $SiO_2$ | 71.62 | 71.62 | 71.62 | 71.62 | 71.62 |
| $B_2O_3$ | 6.16 | 4.16 | 6.16 | 4.16 | 4.16 |
| $Al_2O_3$ | 4.9 | 4.9 | 4.9 | 6.9 | 6.9 |
| $Na_2O$ | 7.94 | 9.94 | 7.94 | 9.94 | 7.94 |
| $K_2O$ | 0.52 | 0.52 | 2.52 | 0.52 | 0.52 |
| CaO | 5.39 | 5.39 | 3.39 | 3.39 | 5.39 |
| F | 4.8 | 4.8 | 4.8 | 4.8 | 4.8 |
| F(A) | ~4.0 | ~4.0 | 4.0 | 4.1 | ~4.0 |
| Op. | L+ | M-D | D | D | L+ |
| W | 2.1 | 4.4 | 5.1 | 9.2 | 2.3 |
| Op. Liq. | 1300° C. | 1275° C. | 1150° C. | 1150° C. | 1250° C. |
| S.P. | 774° C. | 737° C. | 729° C. | ~727° C. | 796° C. |
| A.P. | 559° C. | 531° C. | 530° C. | 525° C. | 571° C. |
| St.P. | 523° C. | 492° C. | 492° C. | 489° C. | 521° C. |
| Exp. | 66.6 | 73.5 | 69.8 | 78.2 | 66.9 |

Table II dramatically illustrates the effects which minor changes in composition can have upon the properties manifested by the resultant glass. To insure good working and forming characteristics, the opal liquidi ought to be no higher than about 1150° C. Hence, Examples 10, 11, and 14 depict glasses not suitable in the present invention.

Based upon the above changes in properties exhibited by the glasses as a result of the compositional variations, the target composition recited below in weight percent was devised which is deemed to constitute the preferred embodiment of the inventive glasses.

| $Na_2O$ | 10.1 ± 0.15 |
| $B_2O_3$ | 6.3 ± 0.15 |
| $Al_2O_3$ | 5.0 ± 0.15 |
| CaO | 2.5 ± 0.1 |
| $K_2O$ | 0.5 ± 0.1 |
| $As_2O_3$ | 0.25 maximum |
| F | 3.9 ± 0.1 analyzed |
| $SiO_2$ | Remainder |

The glass in 2 mm cross section, after heat treatment at 700° C., displays a very dense white appearance and demonstrates the following properties:

| $Na_2O$ Extraction | ~ 7.6 micrograms/$cm^2$ |
| Opal Liquidus | ~ 1050° C. |
| S.P. | ~ 712° C. |
| A.P. | ~ 535° C. |
| St. P. | ~ 492° C. |
| Exp. (0°–300° C.) | ~ 69 × $10^{-7}$/°C. |

It will be appreciated that the inventive glasses may optionally be tinted utilizing the transition metal oxides and rare earth metal oxides in the manner conventional in the glass art.

I claim:

1. An easily meltable, thermally opacifiable, dense white opal glass having a melting temperature no higher than about 1400° C., an opal liquidus no higher than about 1150° C., and a softening point above about 700° C., said glass consisting essentially, expressed in terms of weight percent on the oxide basis, of 7–12% $Na_2O$, 0.8–3.8% CaO, 3–7% $Al_2O_3$, 4–8% $B_2O_3$, 69–75% $SiO_2$, and 3.5–4.5% F.

2. An easily meltable, thermally opacifiable, dense opal glass according to claim 1 also containing up to 4% total of the following compatible metal oxides selected from the group of up to 3% $K_2O$, up to 2% ZnO, and up to 0.25% $As_2O_3$.

* * * * *